(12) United States Patent
Fuchigami

(10) Patent No.: US 12,294,776 B2
(45) Date of Patent: May 6, 2025

(54) ELECTRONIC DEVICE AND IMAGE CAPTURING APPARATUS

(71) Applicant: CANON KABUSHIKI KAISHA, Tokyo (JP)

(72) Inventor: Taro Fuchigami, North Point (HK)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 18/179,449

(22) Filed: Mar. 7, 2023

(65) Prior Publication Data

US 2023/0291985 A1   Sep. 14, 2023

(30) Foreign Application Priority Data

Mar. 8, 2022   (JP) ................................ 2022-035525

(51) Int. Cl.
| | |
|---|---|
| *H04N 23/54* | (2023.01) |
| *F03G 7/06* | (2006.01) |
| *G02B 7/14* | (2021.01) |
| *G03B 30/00* | (2021.01) |

(52) U.S. Cl.
CPC .......... *H04N 23/54* (2023.01); *F03G 7/0614* (2021.08); *G02B 7/14* (2013.01); *G03B 30/00* (2021.01)

(58) Field of Classification Search
CPC .......... H04N 23/54; F03G 7/0614; G02B 7/14
USPC ....................................................... 348/374
See application file for complete search history.

(56) References Cited

U.S. PATENT DOCUMENTS

2010/0059664 A1*   3/2010   Aiba ...................... G03B 17/00
                                                              250/238

FOREIGN PATENT DOCUMENTS

| JP | 3173927 B | 6/2001 |
| JP | 2015056818 | * 3/2015 |

* cited by examiner

*Primary Examiner* — Joel W Fosselman
(74) *Attorney, Agent, or Firm* — Cowan, Liebowitz & Latman, P.C.

(57) ABSTRACT

An electronic device includes a base member, a reference member fixed to the base member, an image sensor, a holding member holding the image sensor and being held by the base member such that a distance from the reference member to the image sensor is changeable, a biasing member generating a first force that biases the holding member in a direction in which the distance increases, and a correction member providing, to the holding member, a second force acting against the first force. The second force changes due to deformation of the correction member depending on its temperature.

24 Claims, 9 Drawing Sheets

ELECTRONIC DEVICE AND IMAGE CAPTURING APPARATUS

FIELD OF THE INVENTION

The present invention relates to an electronic device and an image capturing apparatus each having an image sensor.

DESCRIPTION OF THE RELATED ART

In such electronic devices (image capturing apparatuses), the temperature inside the device rises due to changes in environmental temperature and heat generated by a built-in image sensor and other electronic elements, which may fluctuate a distance from a reference member as a reference for disposing the image sensor to the image sensor.

Japanese Patent No. 3173927 discloses a device as an image reader in which a bimetallic washer that deforms depending on temperature is disposed between a lens holder and a sensor substrate on which an image sensor is mounted, thereby preventing positional displacement of the image sensor in an optical axis direction due to temperature changes.

In the device disclosed in Japanese Patent No. 3173927, the position of the image sensor in the optical axis direction is determined depending on the balance between a force generated by the bimetal washer and a force generated by a spring that biases the sensor substrate. For this reason, it is not easy to determine the position of the image sensor in the optical axis direction at a desired position while adjusting the balance when manufacturing the device.

SUMMARY OF THE INVENTION

The present invention provides an electronic device and an image capturing apparatus that are capable of facilitating position adjustment of an image sensor and suppressing positional displacement of the image sensor due to temperature changes.

The present invention provides as an aspect thereof an electronic device including a base member, a reference member fixed to the base member, an image sensor, a holding member holding the image sensor and being held by the base member such that a distance from the reference member to the image sensor is changeable, a biasing member generating a first force that biases the holding member in a direction in which the distance increases, and a correction member providing, to the holding member, a second force acting against the first force. The second force changes due to deformation of the correction member depending on its temperature.

The present invention provides as another aspect thereof an image capturing apparatus including a base member, a mount that is fixed to the base member and to which a lens unit is detachably attachable, an image sensor, a holding member holding the image sensor and being held by the base member such that a distance from the mount to the image sensor in an optical axis direction is changeable, a retaining member used for attaching the holding member to the base member, a biasing member generating a first force that biases the holding member in a direction in which the distance increases, and a correction member providing, to the holding member, a second force acting against the first force. An elastic modulus of the correction member is greater than that of the biasing member, and the correction member is disposed between the holding member and the retaining member.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Embodiment 1

Figure 1A:
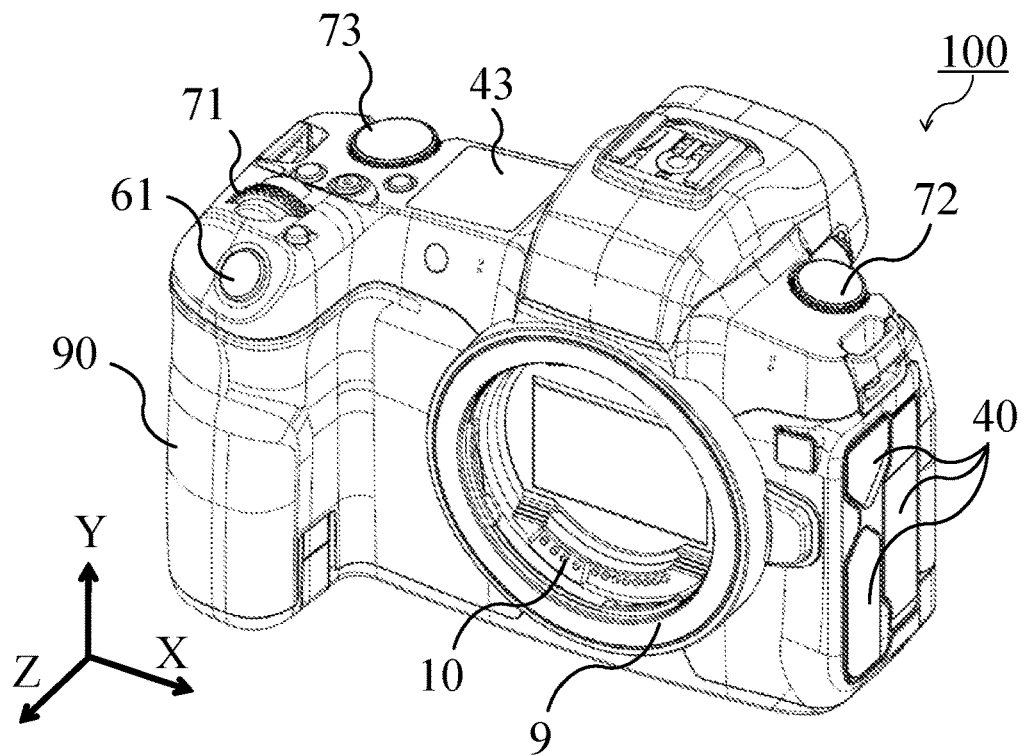
FIGS. 1A and 1B are external views of a camera of Embodiment 1.
Figure 1B:
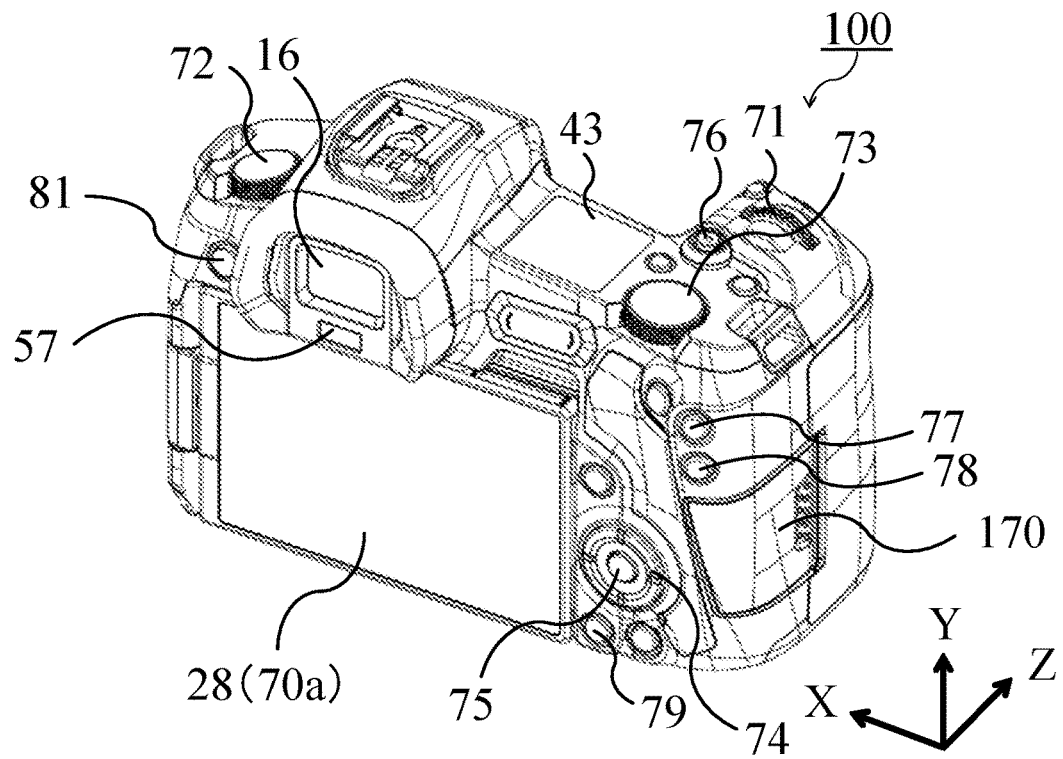
Figure 2:
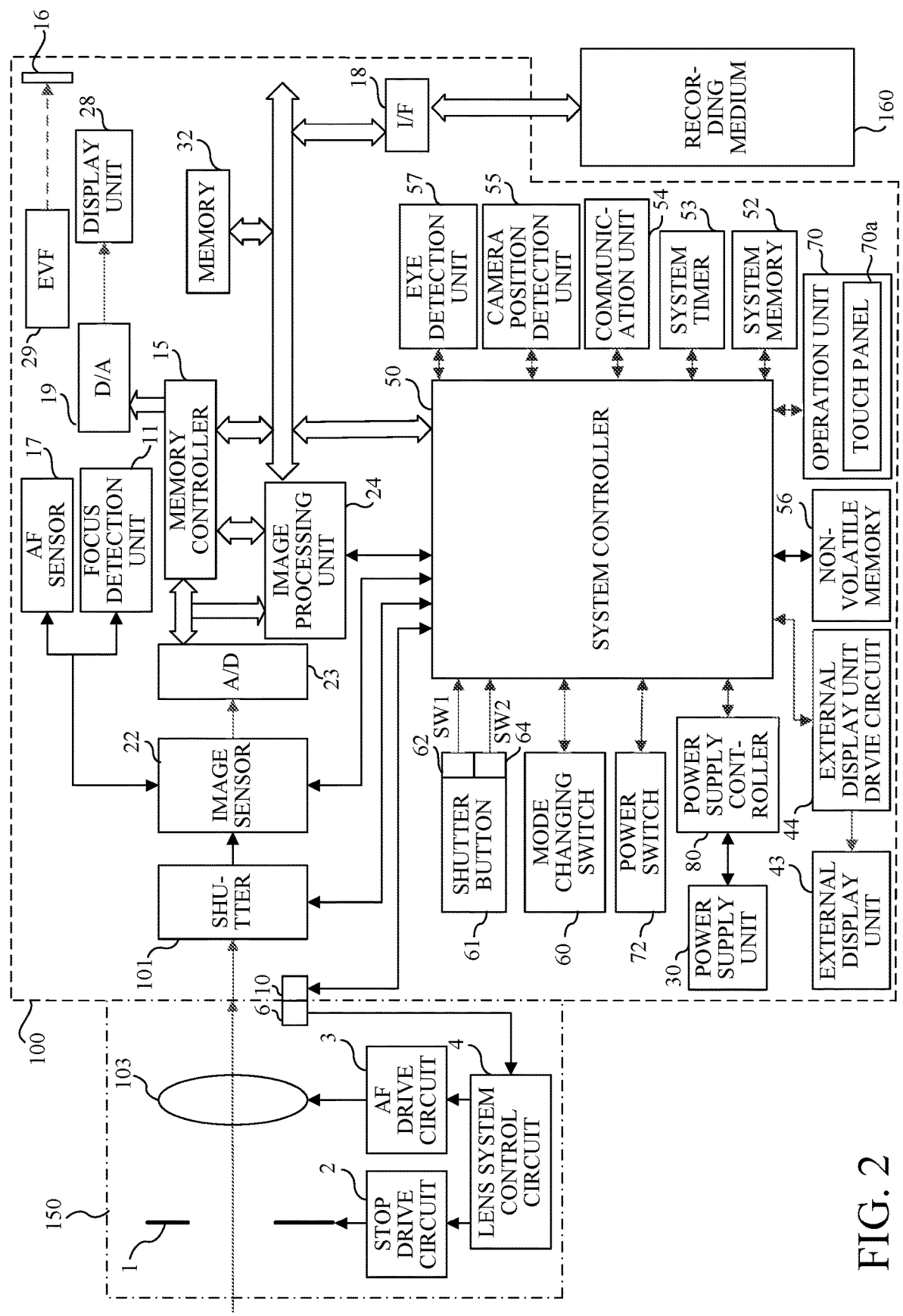
FIG. 2 is a block diagram illustrating the configuration of the camera of Embodiment 1.

FIGS. 1A and 1B illustrate external views of a digital camera (image capturing apparatus: hereinafter simply referred to as a camera) 100 as an electronic device that is Embodiment 1. FIG. 1A illustrates the camera 100 viewed obliquely from its front side, and FIG. 1B illustrates the camera 100 viewed obliquely from its rear side. An optical axis direction of the camera (in other words, of an interchangeable lens attached to the camera 100) is a Z direction, a horizontal direction (lateral direction) is an X direction, and a vertical direction (longitudinal direction) is a Y direction. FIG. 2 illustrates the electrical configuration of the camera 100 and a lens unit 150.

In the camera 100, a grip portion 90 is a part gripped by a user's right hand for holding the camera 100. A display unit 28 is provided on the back surface of the camera 100 and displays images and various information. A touch panel 70a is included in an operation unit 70 in FIG. 2 and detects a user's touch operation on the display surface (operation surface) of the display unit 28. An external display unit 43 is provided on the upper surface of the camera 100 and displays various setting values such as a shutter speed and an aperture value.

A shutter button 61 is operated by a user who instructs image capturing. A mode changing switch 60 illustrated in FIG. 2 is operated by the user to change operation modes of the camera 100. A terminal cover 40 is a cover to protect a connector (not illustrated) to which a cable for connecting with an external device is connected. A power switch 72 is operated by the user to switch on and off of the power of the camera 100.

The operation unit 70 includes, in addition to the mode changing switch 60 illustrated in FIGS. 1A and 1B, a main electronic dial 71, a sub-electronic dial 73, a cross key 74, a SET button 75, a movie button 76, an AE lock button 77, an enlargement button 78, a play button 79 and a menu button 81. The main electronic dial 71 is rotationally operated by the user to change the setting values such as the shutter speed and the aperture value. The sub-electronic dial 73 is operated by the user to move an area (selected frame) for photometry and focus detection, to feed the displayed images and the like. The cross key 74 is a four-way key whose upper, lower, left and right portions can be pressed. According to the pressed portion of the cross key 74, menu selection, changes of setting values and the like are performed. The SET button 75 is operated by the user to determine selected menu items, setting values and the like.

The movie button 76 is operated by the user to instruct start and stop of capturing a moving image for recording. The AE lock button 77 is operated by the user to fix an exposure setting in an image capturing standby state. The enlargement button 78 is operated by the user to turn on and off an enlargement mode in a display state of a live-view image on the display unit 28. The rotation of the main electronic dial 71 after turning on the enlargement mode makes it possible to enlarge or reduce the displayed live-view image. Further, the operation of the enlargement button 78 in a play mode increases the enlargement ratio of the captured image to be displayed on the display unit 28. The play button 79 is operated by the user to switch between an image capturing mode and the play mode. The menu button 81 is operated by the user to display a menu screen for performing various settings on the display unit 28.

The camera 100 has a mount 9 to which the lens unit 150 is detachably attached. The mount 9 is a metal member and is a reference member that serves as a reference for a flange back that is a distance in the optical axis direction from the front end surface of the mount 9 in the Z direction to an image capturing surface of an image sensor 22 described later. Communication terminals 10 provided inside the mount 9 are terminals used for communication between the camera 100 and the lens unit 150.

An eyepiece 16 is a part where a user's eye observing an EVF 29 illustrated in FIG. 2 contacts. The user can visually recognize an image displayed on the EVF 29 through the eyepiece 16. The eye detection unit 57 illustrated in FIG. 2 is a sensor for detecting the user's eye contacting the eyepiece 16. A slot lid 170 is a lid covering a slot that stores a recording medium 160.

In FIG. 2, the lens unit 150 has an image capturing lens 103. The image capturing lens 103 is illustrated as a single lens in the drawing, but actually includes a plurality of lenses. Communication terminals 6 are terminals used for communication between the lens unit 150 and the camera 100. A lens system control circuit 4 in the lens unit 150 communicates with a system controller 50 in the camera 100 via the communication terminals 6 and 10. The lens system control circuit 4 controls, in response to commands from the system controller 50, a stop drive circuit 2 to drive an aperture stop 1 and controls an AF drive circuit 3 to move a focus lens in the image capturing lens 103.

In the camera 100, the image sensor 22 is a photoelectric conversion element configured by a CCD sensor, a CMOS sensor or the like. The image sensor 22 captures (photoelectrically converts) an optical image formed by the image capturing lens 103. An AE sensor 17 detects the brightness of an object from signals output from the image sensor 22 to output brightness information. The system controller 50 performs exposure control (AE) for setting the aperture value and the shutter speed on the basis of the brightness information. The focus detection unit 11 detects a focus state relative to the object from the signals output from the image sensor 22 to output defocus amount information. The system controller 50 performs autofocus (AF) as focus control for the image capturing lens 103 on the basis of the defocus amount information. In the present embodiment, the AF is performed by an image capturing surface phase difference detection method.

A shutter 101 is a focal plane shutter that opens and closes under control of the system controller 50 to control an exposure time of the image sensor 22. An A/D converter 23 converts analog signals output from the image sensor 22 into digital signals (image capturing data). The image processing unit 24 performs image processing such as pixel interpolation, resizing processing and color conversion processing on the image capturing data from the A/D converter 23 or a memory controller 15 to generate image data. Further, the image processing unit 24 performs AWB (auto white balance) processing on the basis of a result of calculation processing using the image data. The image capturing data from the A/D converter 23 is written into a memory 32 via the image processing unit 24 and the memory controller 15 or directly from the memory controller 15.

The memory 32 stores the image capturing data from the A/D converter 23 and the image data to be displayed on the display unit 28 and the EVF 29. A D/A converter 19 converts the displaying image data read from the memory 32 into analog signals to supply the analog signals to the display unit 28 and the EVF 29. Thereby, images corresponding to the displaying image data are displayed on the display unit 28 and the EVF 29.

The display unit 28 and the EVF 29 are each configured by a display device such as an LCD and an organic EL. The system controller 50 switches display and non-display of the display unit 28 and the EVF 29 depending on whether or not the eye detection unit 57 detects the user's eye contacting the eyepiece unit 16.

The external display unit 43 displays the various setting values as described above via an external display driving circuit 44. A non-volatile memory 56 is an electrically erasable and recordable memory such as an EEPROM, and stores constants, programs and the like for the operation of the system controller 50.

The system controller 50 is a computer configured by at least one processor or circuit, and controls the entire image capturing system including the camera 100 and lens unit 150. The system controller 50 executes various processes according to the program that is stored in the non-volatile memory 56 and is developed in the system memory 52. The system memory 52 is a RAM or the like, and also stores constants and variables for the operation of the system controller 50.

A system timer 53 measures times used for the various processes and a built-in clock time. The mode changing switch 60, a first shutter switch 62, a second shutter switch 64 and the operation unit 70 are operated by the user to input various instructions to the system controller 50. The operation of the mode changing switch 60 changes the operation mode of the camera 100 to a still image capturing mode, a moving image capturing mode, the play mode and the like.

The first shutter switch 62 is turned on by a half-pressing operation of the shutter button 61 to generate a first shutter switch signal SW1. The system controller 50 having received the first shutter switch signal SW1 performs an image capturing preparation operation including processes for AE, AF and AWB. The second shutter switch 64 is turned on by a full pressing operation of the shutter button 61 to generate a second shutter switch signal SW2. The system controller 50 having received the second shutter switch signal SW2 performs a series of operations for image capturing including control of the shutter 101, control of charge accumulation and signal readout of the image sensor 22, generation of the recording image data in the image processing unit 24 and writing of the recording image data to the recording medium 160.

A power supply controller 80 is configured by a battery detection circuit, a DC-DC converter, a switch circuit for switching energization units and the like, and detects whether or not a battery is installed, the type of the battery and the remaining amount of the battery. Further, the power supply controller 80 controls the DC-DC converter depending on the detection results to supply a predetermined power to each of the above-described units including the recording medium 160. The power supply unit 30 is configured by a primary battery, a secondary battery, an AC adapter and the like. A recording medium I/F 18 is an interface with the recording medium 160 such as a memory card (semiconductor memory) or a magnetic disk. A communication unit 54 transmits and receives various data such as the image data to and from external devices connected through wireless communication or wired communication.

The camera position detection unit 55 detects the position (attitude) of the camera 100 relative to the direction of gravitational force. On the basis of the detected camera position, the system controller 50 performs determination of up, down, left and right of the image data and rotation processing of the image data, and adds camera position information to the image data. As the camera position detection unit 55, an acceleration sensor, a gyro sensor or the like is used.

Figure 3A:
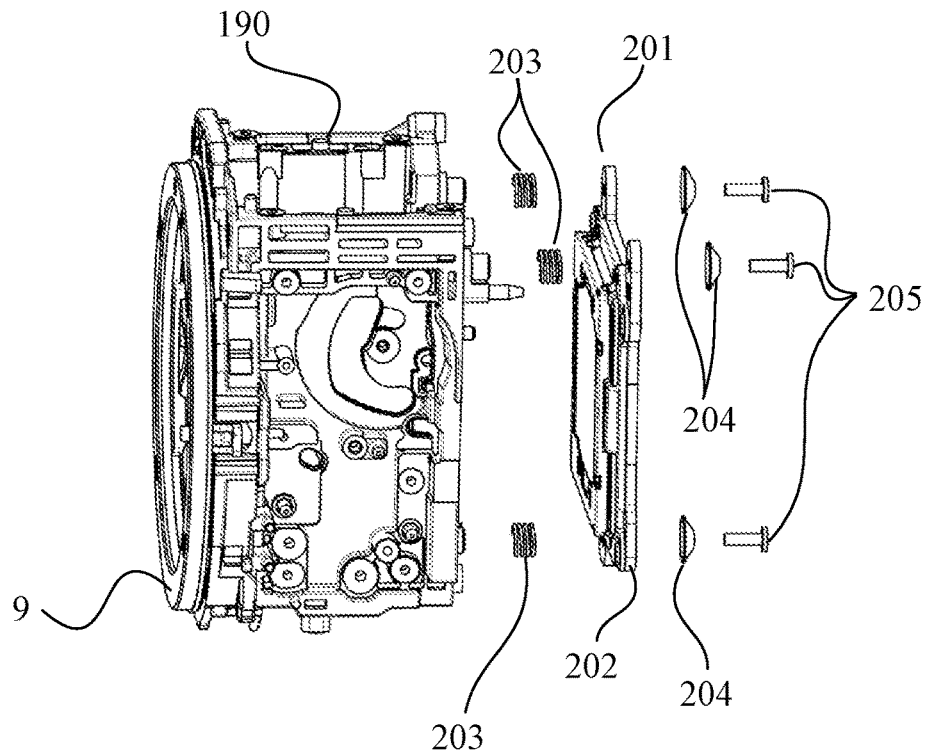
FIGS. 3A and 3B illustrates a flange back correction mechanism of the camera in Embodiment 1.
Figure 3B:
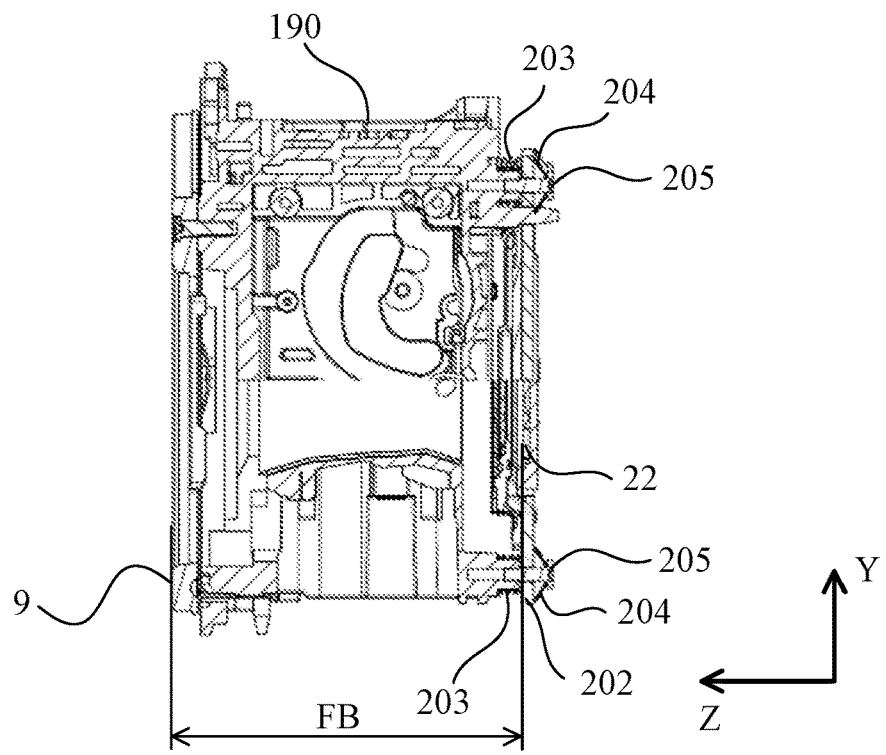

FIGS. 3A and 3B illustrate a flange back correction mechanism in the camera 100. The flange back is, in other words, a flange focal length. FIG. 3A is an exploded view of the flange back correction mechanism, and FIG. 3B is a sectional view of the flange back correction mechanism.

The mount 9 is fixed to a camera's main body 190 that is a base member made of resin. The image sensor 22 is held by an image capturing base plate (holding member) 202 of an image capturing unit 201. An adjusting spring (biasing member) 203 that is a compression coil spring is disposed between the image capturing base plate 202 and the main body 190. The adjusting spring 203 has, in a state of being elastically deformed (compressed), one end in contact with the main body 190 and the other end in contact with the image capturing base plate 202. Therefore, the adjusting spring 203 generates a biasing force (first force) that biases the image capturing base plate 202 in the direction (−Z direction) opposite to the mount 9, that is, in the direction in which the flange back increases.

Figure 4:
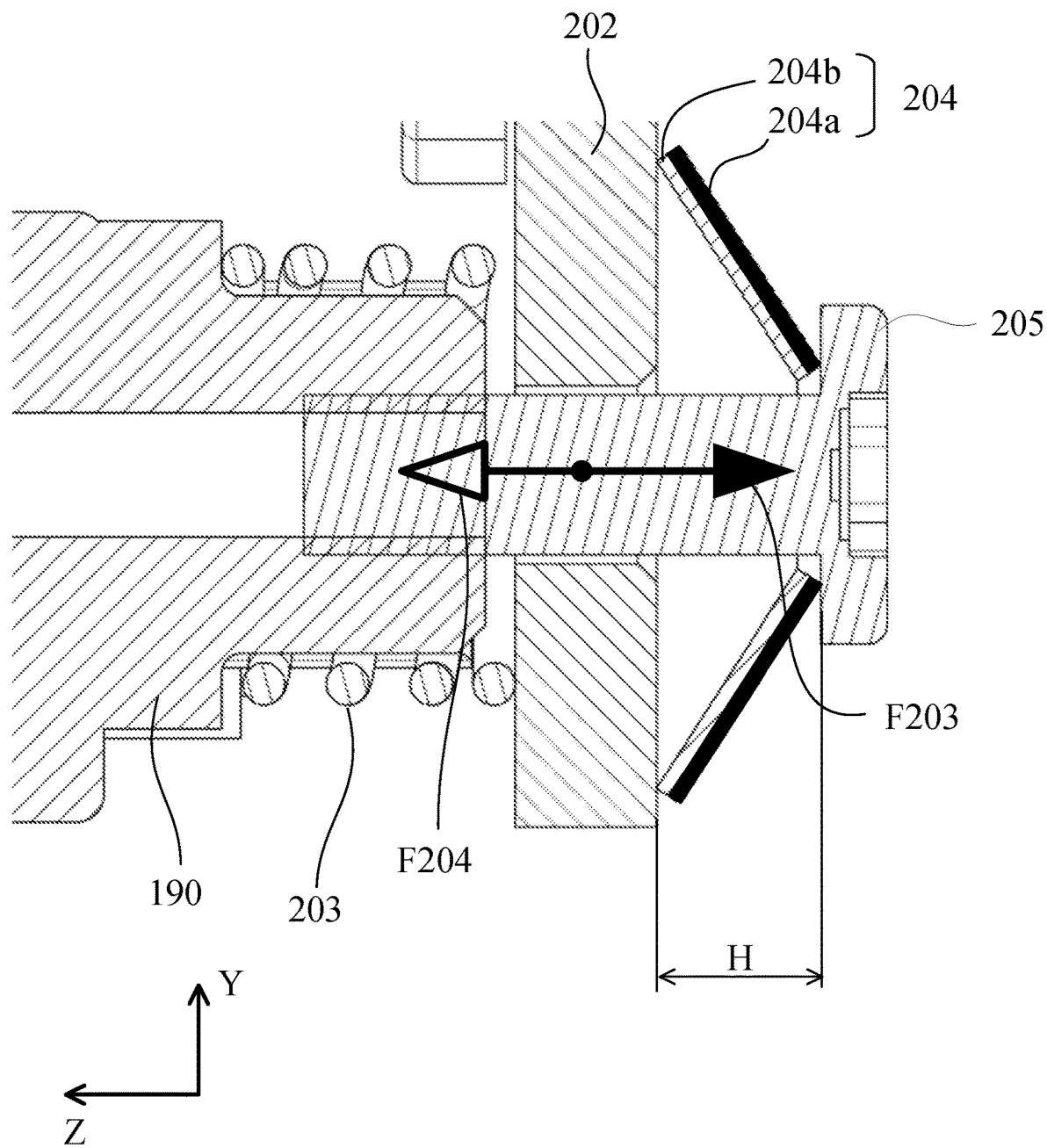
FIG. 4 is an enlarged sectional view of a part of the flange back correction mechanism in Embodiment 1.

Bimetal washers (correction members) 204 are arranged at three locations on the opposite side of the image capturing base plate 202 to the mount 9, the three locations being around the center (optical axis) of the image sensor 22. As illustrated in FIG. 4 as an enlarged sectional view, a screw (retaining member) 205 as a fastening member is passed through a hole formed in the center of each bimetal washer 204 from the opposite side to the mount 9. The male threaded portion of the screw 205 is screwed into the female threaded portion provided on the main body 190. One end of each bimetal washer 204 contacts the image capturing base plate 202 and the other end thereof contacts the head of the screw 205. Each bimetal washer 204 is a washer made of bimetal and bends so as to generate a reaction force (second force) that balances the biasing force of the adjusting spring 203.

FIG. 3B illustrates a flange back FB from the mount 9 (from its front end surface) to the image sensor 22 (to its image capturing surface). It is necessary that the flange back be precisely adjusted according to a focal length of the image capturing lens 103. A change in the flange focal length causes out of focus for the object even though the AF is performed.

The flange back can be adjusted by changing the tightened amount of the screw 205 (that is, the position of the head of the screw 205 relative to the main body 190 in the Z direction). As described above, the position of the image capturing base plate 202, that is, the position of the image sensor 22 relative to the mount 9, is determined to a position where the biasing force from the adjusting spring 203 and the reaction force from the bimetal washer 204 are balanced to each other.

In this embodiment, the spring constant of the bimetal washer 204 is set greater than that of the adjusting spring 203. Therefore, when the screw 205 is tightened, the adjusting spring 203 is deformed while the bimetal washer 204 is hardly deformed. With such a configuration, the difference in the displacement amount of the image capturing base plate 202 relative to the elastic deformation amount (compression amount) of the adjusting spring 203 can be reduced. Thus, increasing or decreasing the tightened amount of the screw 205 while measuring the distance between the mount 9 and the image sensor 22 makes it possible to easily adjust the flange back.

FIG. 4 illustrates the biasing force F203 from the adjusting spring 203 and the reaction force F204 from the bimetal washer 204 that each act on the image capturing base plate 202. Although the actual biasing force and the reaction force act as distributed loads on contact portions of the image capturing base plate 202 contacting the adjusting spring 203 and the bimetal washer 204, FIG. 4 illustrates a resultant force of each distributed load by one arrow.

As illustrated in FIG. 4, the bimetal washer 204 is formed of a bimetal in which two types of alloy layers, that is, a high expansion layer 204a and a low expansion layer 204b are laminated in order from the side opposite to the mount 9. The high expansion layer 204a has a higher coefficient of linear expansion than that of the low expansion layer 204b. The bimetal washer 204 deforms depending on its temperature such that its height H in the Z direction (the direction of the second force) changes. Specifically, when the temperature of the bimetal washer 204 rises, the high expansion layer 204a expands more than the low expansion layer 204b, and thereby the height H increases. Conversely, when the temperature of the bimetal washer 204 lowers, the high expansion layer 204a contracts more than the low expansion layer 204b, and thereby the height H decreases.

In general, the internal temperature of a camera rises due to heat generated by electronic elements such as an image sensor and an image processing element in the camera. The internal temperature also changes depending on the temperature of an environment in which the camera is used. When the internal temperature changes, the members relating to the flange back (the mount 9, the main body 190, etc. in this embodiment) deform according to their coefficients of linear expansion. Thus, when the internal temperature of the camera rises, the flange back becomes longer, and when the internal temperature drops, the flange back becomes shorter. Accordingly, even if the flange back is adjusted in a normal temperature environment, the flange back changes according to an increase in the internal temperature due to a subsequent change in the environmental temperature or due to a long-term use of the camera in the normal temperature environment. In particular, if the internal temperature changes during image capturing in a state where the focus position (position of the focus lens) with respect to the object is fixed, the focus state with respect to the object will become an out-of-focus state.

In this embodiment, use of the bimetal washer 204 reduces the changes in the flange back caused by the changes in the internal temperature of the camera 100. When the internal temperature of the camera 100 rises, the main body 190 expands, and thereby the image capturing base plate 202 is displaced in the −Z direction. However, when the height H of the bimetal washer 204 increases, the reaction force from the bimetal washer 204 causes the image capturing base plate 202 to move in a direction closer to the mount 9 (that is, in the +Z direction). As a result, the change in the flange back can be corrected.

On the other hand, when the internal temperature lowers, the main body 190 contracts, and thereby the image capturing base plate 202 is displaced in the +Z direction. However, since the height H of the bimetal washer 204 reduces, the image capturing base plate 202 moves in a direction away from the mount 9 (that is, in the −Z direction) by the biasing force of the adjusting spring 203 in the −Z direction. As a result, the change in the flange back can be corrected.

Arranging the bimetal washers at the multiple locations (three locations) around the optical axis as described above makes it possible to accurately correct the changes in the flange back without tilting the image sensor 22.

Figure 5:
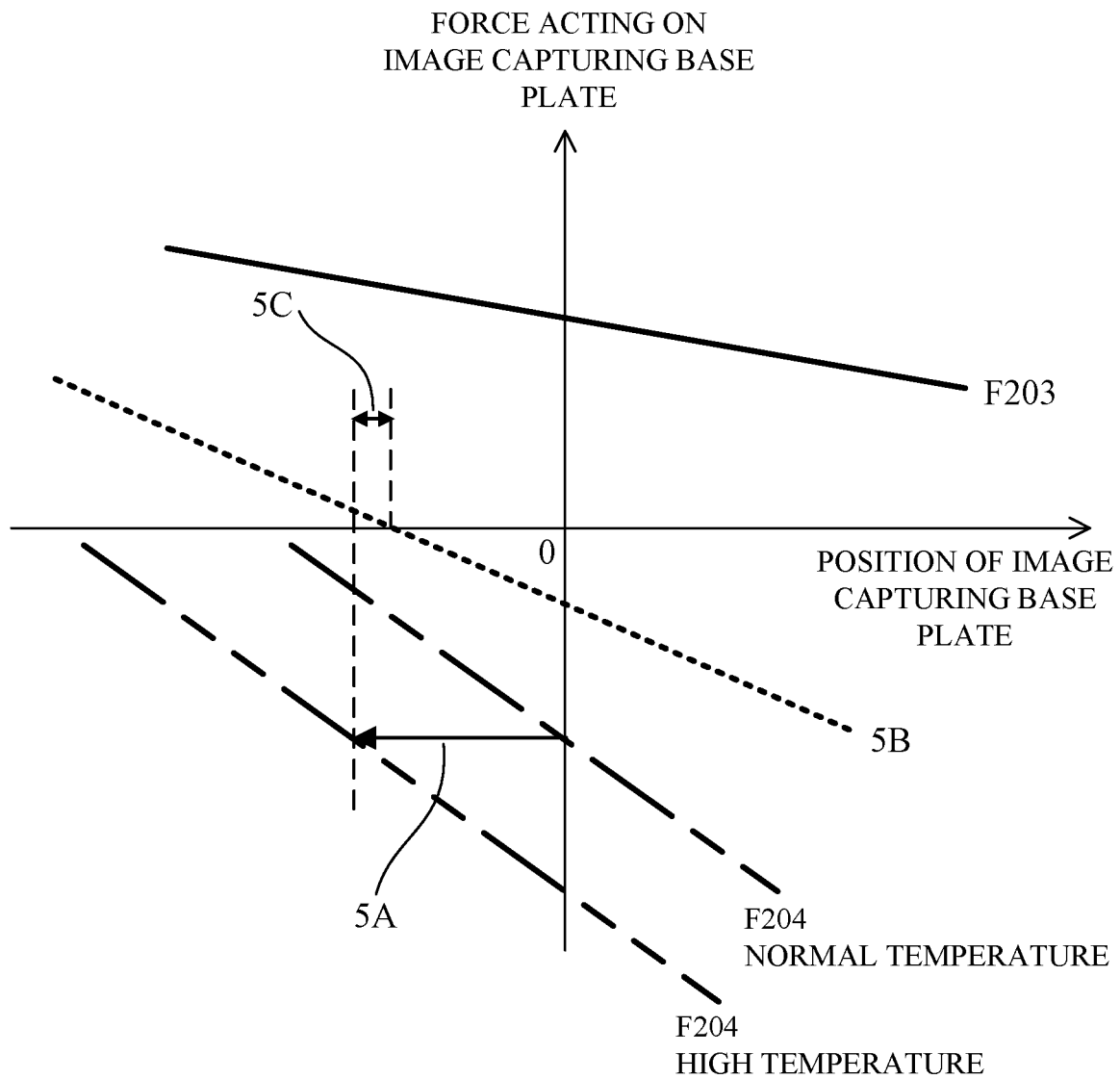
FIG. 5 illustrates the relation between a force acting on an image capturing base plate and the position of the image capturing base plate in Embodiment 1.

FIG. 5 illustrates the relation between the forces acting on the image capturing base plate 202 (shown in the vertical axis) and the position of the image capturing base plate 202 relative to the main body 190 in the optical axis direction (shown in the horizontal axis). The solid line indicates the biasing force F203 from the adjusting spring 203 (hereinafter referred to as a spring biasing force). The dashed-dotted line and the dashed-two dotted line respectively represent the reaction force (hereinafter referred to as a washer reaction force) F204 from the bimetal washer 204 at a normal temperature (first temperature) and at a high temperature (second temperature) higher than the normal temperature. In the drawing, the displacement amount of the image capturing base plate 202 in the −Z direction is shown as positive amount (right in the drawing), the spring biasing force is shown as positive direction force, and the washer reaction force is shown as negative direction force.

When the image capturing base plate 202 moves in the −Z direction relative to the main body 190, the compression amount of the adjusting spring 203 decreases, and thereby the spring biasing force F203 decreases. On the other hand, when the bimetal washer 204 is pushed in the −Z direction by the image capturing base plate 202, the washer reaction force (absolute value) F204 increases. Conversely, when the image capturing base plate 202 moves in the +Z direction relative to the main body 190, the compression amount of the adjusting spring 203 increases, and thereby the spring biasing force F203 increases.

Further, the force of the image capturing base plate 202 pushing the bimetal washer 204 reduces, so that the washer reaction force F204 also reduces. Under such a force relation, the position of the image capturing base plate 202 is determined to a position where the spring biasing force F203 and the washer reaction force F204 are balanced to each other. This state at the normal temperature is the reference state (that is, a state where the image capturing base plate 202 is at the 0 position). When the internal temperature of the camera 100 rises from the normal temperature to the high temperature, the height H of the bimetal washer 204 increases as described above. In this state, assuming that the image capturing base plate 202 does not move in the +Z direction, the washer reaction force F204 increases by the increase amount of the height H, and the washer reaction force F204 at the normal temperature indicated by the dashed-dotted line increases to that at the high temperature indicated by the dashed-two dotted line.

Reference character 5A in FIG. 5 represents the change amount of the height H of the bimetal washer 204 when its temperature rises from the normal temperature to the high temperature. The resultant force 5B of the spring biasing force F203 and the washer reaction force F204 (high temperature) acting on the image capturing base plate 202 in this state is indicated by the dashed line. When the image capturing base plate 202 moves in the +Z direction, the image capturing base plate 202 moves to the position where the resultant force 5B becomes 0 (that is, where the dashed line intersects the horizontal axis). In other words, the image capturing base plate 202 moves to the position where the spring biasing force F203 and the washer reaction force F204 (high temperature) are balanced to each other. As a result, the displacement of the image capturing base plate 202 in the −Z direction due to the expansion of the main body 190 can be corrected (reduced). In this state, the displacement amount of the image capturing base plate 202 is canceled by an amount indicated by 5C due to the increase in the spring biasing force F203 corresponding to the change amount 5A of the height H of the bimetal washer 204.

The above description on FIG. 5 was made on the case where the internal temperature of the camera 100 rises. The same behavior occurs when the screw 205 is tightened in the direction of compressing the adjusting spring 203 for adjusting the flange back. That is, the cancellation amount of 5C is generated corresponding to the compression amount 5A of the adjusting spring 203. If the value of 5C is large, it takes time to reach a target adjustment amount and the effect of correcting the changes in the flange back due to temperature changes is reduced. Therefore, it is desirable to reduce the value of 5C.

The value of the cancellation amount 5C is determined by the relation between the spring constants of the adjusting spring 203 and the bimetal washer 204 (that is, the inclination of each line in the drawing). If the spring constant of the bimetal washer 204 is smaller than that of the adjusting spring 203, the cancellation amount 5C becomes large.

As can be seen from FIG. 5, in this embodiment, the spring constant of the bimetal washer 204 is set larger than that of the adjusting spring 203. Therefore, it is possible to reduce the cancellation amount 5C in the flange back adjustment and thus to facilitate the flange back adjustment. Further, even if the internal temperature of the camera 100 changes, it is possible to prevent the flange back correction effect from being reduced, and thereby to improve the reliability of maintaining the flange back against the changes in the internal temperature.

Embodiment 2

Figure 6A:
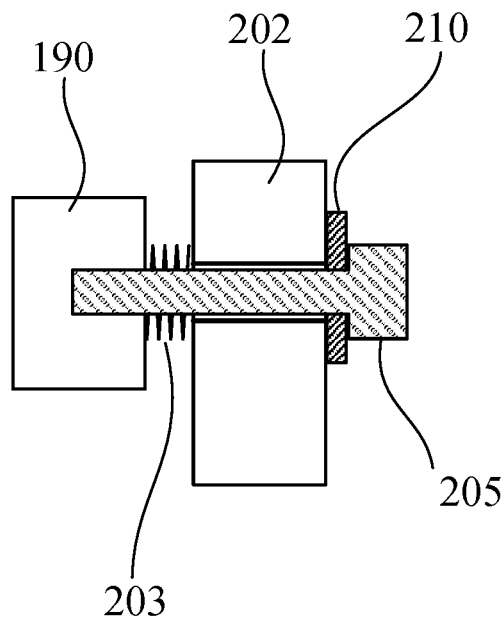
FIGS. 6A to 6C illustrate a flange back correction mechanism in Embodiment 2.
Figure 6B:
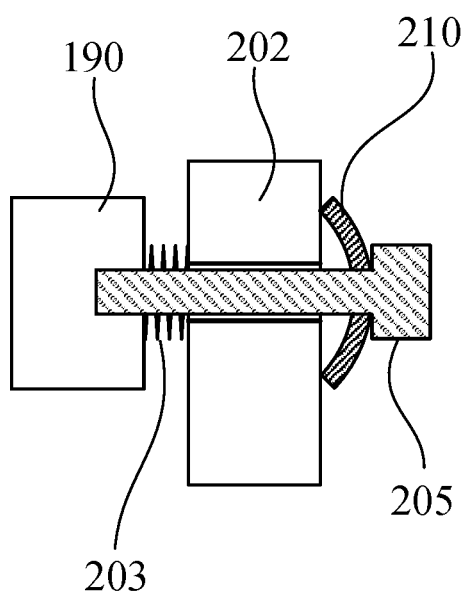
Figure 6C:
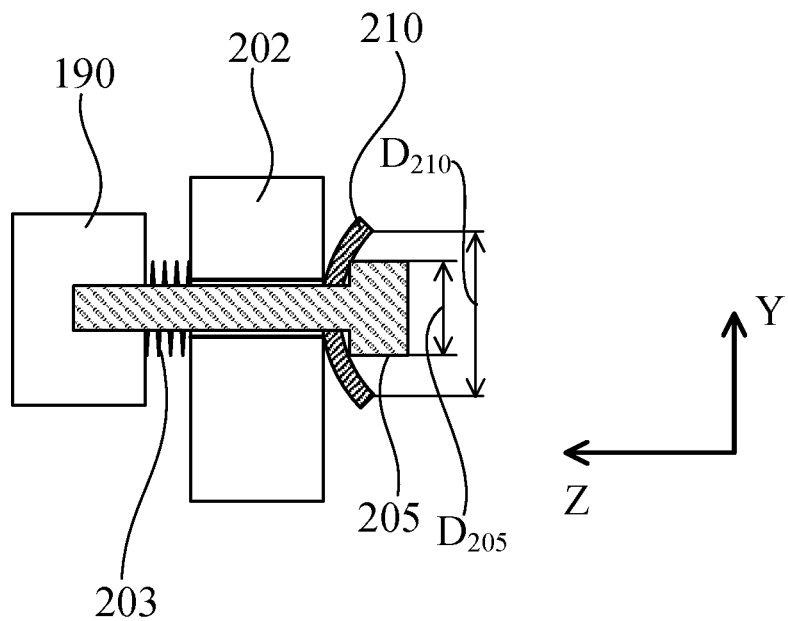

FIGS. 6A to 6C schematically illustrate the flange back correction mechanism in Embodiment 2 as a modified example of Embodiment 1. In this embodiment, the same reference numerals as those in Embodiment 1 are given to the constituent elements common to those in Embodiment 1.

In this embodiment, a bimetal washer 210 having a shape different from that of the bimetal washer 204 in Embodiment 1 is used. At a room temperature, the bimetal washer 210 has a flat shape, as illustrated in FIG. 6A. Although details are not illustrated, the bimetal washer 210 is formed of two types of alloy layers as in Embodiment 1, that is, a high expansion layer is disposed on the back side (−Z side) of the camera 100, and a low expansion layer is disposed on the mount side (+Z side).

In the state of FIG. 6A, the bimetal washer 210 hardly bends because a load is applied to the bimetal washer 210 in its plate thickness direction. That is, the spring constant is extremely high. Therefore, the flange back can be easily adjusted by tightening the screw 205 as described in Embodiment 1.

When the internal temperature of the camera 100 becomes higher than the room temperature, the bimetal washer 210 bends so as to be convex toward the back side as illustrated in FIG. 6B. Thus, the image capturing base plate 202 moves toward the mount side while resisting the biasing force from the adjusting spring 203. This makes it possible to correct an increase in the flange back due to the expansion of the main body 190 according to an increase in the internal temperature. Since the reaction force from the bimetal washer 210 and its spring constant are set to be greater than those of the adjusting spring 203, a sufficient flange back correction effect can be provided.

When the internal temperature of the camera 100 becomes lower than the room temperature due to a decrease in the environmental temperature or the like, the bimetal washer 210 bends so as to be convex toward the mount side as illustrated in FIG. 6C. The diameter (outer shape dimension) $D_{210}$ of the bimetal washer 210 is set larger than the diameter $D_{205}$ of the head of the screw 205 with which the bimetal washer 210 make contact. Therefore, the bimetal washer 210 can be greatly bent without being interfered by the head of the screw 205. Since the bimetal washer 210 has the convex shape toward the mount side, the movement amount of the image capturing base plate 202 toward the mount side can be reduced even if the bent amount (absolute value) of the bimetal washer 210 is the same as that in the case illustrated in FIG. 6B. That is, when the main body 190 contracts so as to shorten the flange back due to the decrease in the internal temperature, the amount by which the flange back is shortened due to the bend of the bimetal washer 210 can be reduced.

Embodiment 3

Figure 7A:
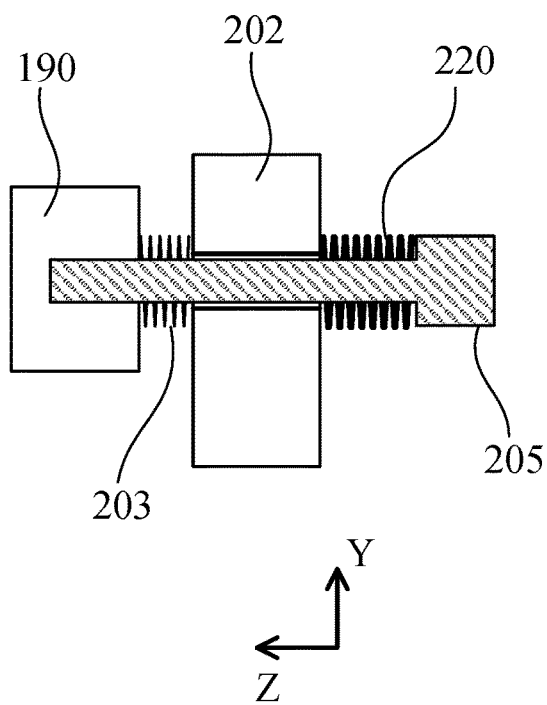
FIGS. 7A and 7B illustrate a shape memory alloy spring in Example 3.
Figure 7B:
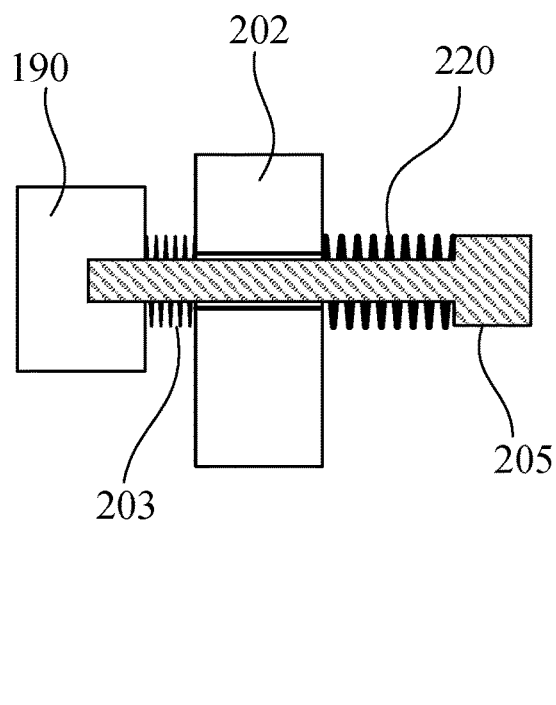

FIGS. 7A and 7B schematically illustrate a flange back correction mechanism in Embodiment 3 as a modified example of Embodiment 1. In this embodiment, the same reference numerals as those in Embodiment 1 are given to the constituent elements common to those in Embodiment 1.

In this embodiment, instead of the bimetal washer 204 as the correction member used in Embodiment 1, a shape memory alloy spring 220 is used. The shape memory alloy spring 220 is a compression coil spring made of shape memory alloy, and is disposed between the image capturing base plate 202 and the head of the screw 205 as with the bimetal washer 204. The shape memory alloy spring 220 has a characteristic that its elastic modulus changes significantly before and after its temperature becomes higher than its transformation temperature (transformation point) as with general shape memory alloys.

When the internal temperature of the camera 100 is a normal temperature below the transformation point, as illustrated in FIG. 7A, the shape memory alloy spring 220 is in a state of generating almost no elastic force. Therefore, the shape memory alloy spring 220 is almost completely compressed by the biasing force from the adjusting spring 203, and thereby becomes the same as a rigid body. Thus, the screw 205 can be tightened without receiving the reaction force from the shape memory alloy spring 220, and thereby the flange back can be easily adjusted.

When the internal temperature of the camera 100 is higher than the transformation point, as illustrated in FIG. 7B, the elastic modulus of the shape memory alloy spring 220 greatly increases compared to when the internal temperature is the normal temperature. As a result, the image capturing base plate 202 receives the reaction force from the shape memory alloy spring 220, and thereby moves toward the mount side against the biasing force from the adjusting spring 203. This makes it possible to correct an increase in the flange back due to the expansion of the main body 190 according to an increase in the internal temperature. Further, the spring constant of the shape memory alloy spring 220 at a temperature exceeding the transformation point is set to be sufficiently larger than the spring constant of the adjusting spring 203. Therefore, a sufficient flange back correction effect can be provided.

Embodiment 4

Embodiment 4 will describe examples of different shapes of the bimetal washer 204 in the flange back correcting mechanism of Embodiment 1. In this embodiment, the same reference numerals as those in Embodiment 1 are given to the constituent elements common to those in Embodiment 1.

Figure 8A:
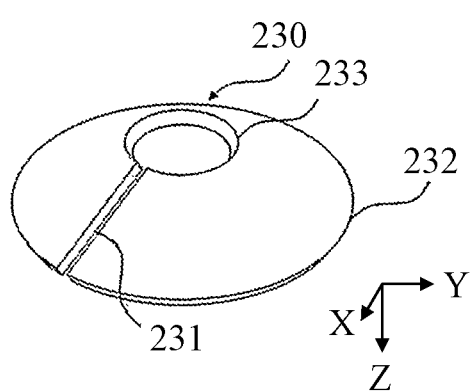
FIG. 8A to 8E illustrate bimetal washers in Example 4.
Figure 8B:
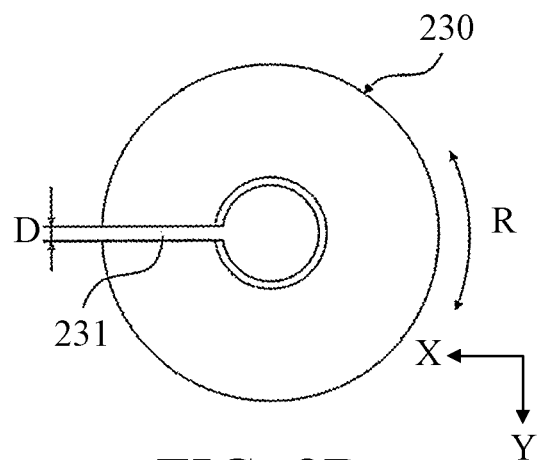
Figure 8C:
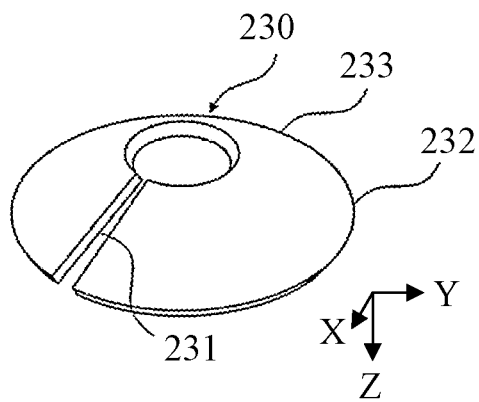
Figure 8D:
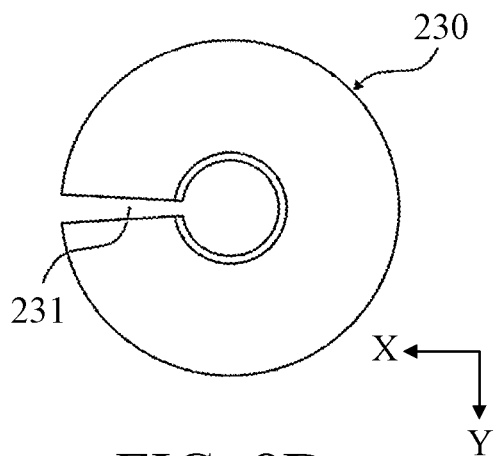

FIGS. 8A to 8D illustrate bimetal washers 230 of this embodiment viewed obliquely and from the front. In this embodiment, each bimetal washer 230 is formed in a conical shape and has a slit portion 231. The slit portion 231 of the bimetal washer 230 illustrated in FIGS. 8A and 8B extends from its outer edge portion 232 toward its inner edge portion 233 of the bimetal washer 230. The both sides of the slit portion 231 are formed parallel to each other. As illustrated in FIGS. 8C and 8D, the slit portion 231 may be formed such that its slit width changes from the outer edge portion 232 toward the inner edge portion 233. Each of the bimetal washers 230 of this embodiment is formed of two types of alloy layers as in Embodiment 1, that is, a high expansion layer is disposed on the back side (−Z side) of the camera 100, and a low expansion layer is disposed on the mount side (+Z side).

When the internal temperature of the camera 100 becomes higher than the room temperature, the bimetal washer 230 bends so as to be convex toward the back side as in Embodiment 1. In Embodiment 1, the description was made of only the displacement of the bimetal washer 204 in the optical axis direction (Z direction). However, when the bimetal washer 230 has a conical shape as illustrated in FIG. 8A, a displacement (or deformation) in its circumferential direction (R direction in the drawing) also occurs due to the difference in expansion between the high expansion layer and the low expansion layer. This embodiment considers the displacement of the bimetal washer 230 in the circumferential direction.

Figure 8E:
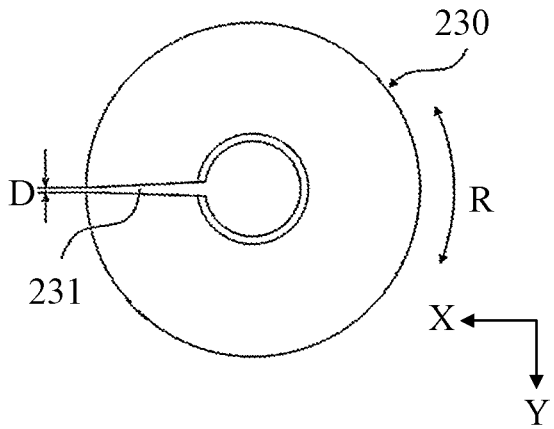

FIGS. 8B and 8E respectively illustrate the shapes of the bimetal washer 230 at the room temperature and at the high temperature when viewed from the front. When the internal temperature of the camera 100 becomes higher than the room temperature, the bimetal washer 230 deforms such that the width D of the slit portion 231 becomes narrower as illustrated in FIG. 8E. This is because of the above-described displacement the bimetal washer 230 in the circumferential direction. That is, providing the slit portion 231 makes it possible to release a displacement (or deformation) restraint in the circumferential direction, and thereby to increase the displacement amount of the bimetal washer 230 in the optical axis direction. This configuration can enhance the flange back correction effect by the bimetal washer 230.

Moreover, in order to further enhance the flange back correction effect, it is desirable to set the width D of the slit portion 231 to an appropriate amount. The displacement amount of the bimetal washer 230 in the circumferential direction changes depending on the amount of increase in the internal temperature of the camera 100. Furthermore, the displacement amount in the circumferential direction changes also depending on the diameter of the bimetal washer 230. Therefore, it is necessary to set the width D of the slit portion 231 according to an assumed internal temperature of the camera 100 and the diameter of the bimetal washer 230 such that the slit portion 231 does not close (that is, the both ends of the slit portion 231 do not contact each other). On the other hand, when the width D of the slit portion 231 is set wide, the spring constant of the bimetal washer 230 decreases. Since the cancellation amount 5C illustrated in FIG. 5 increases as the spring constant decreases, the flange back correction effect may decrease. That is, in order to maximize the flange back correction effect, it is desirable to set the width D of the slit portion 231 to the minimum width at which the slit portion 231 does not close at the entire assumed internal temperature range.

The bimetal washer 230 illustrated in FIGS. 8C and 8D has a shape set in consideration of the above viewpoint. The slit portion 231 of the bimetal washer 230 illustrated in FIGS. 8C and 8D has a shape in which its width narrows from the outer edge portion 232 toward the inner edge portion 233. As the diameter of the bimetal washer 230 increases, the displacement amount thereof in the circumferential direction also increases. That is, compared to the inner edge portion 233 with a smaller diameter, the outer edge portion 232 with a larger diameter tends to have a larger displacement amount in the circumferential direction. On the other hand, in order to enhance the flange back correction effect, it is desirable to set the spring constant of the bimetal washer 230 as large as possible.

In other words, providing the width of the slit portion 231 so as to narrow from the outer edge portion 232 toward the inner edge portion 233 makes it possible to realize a shape in which the slit portion 231 does not close while suppressing a decrease in the spring constant. As a result, the flange back correction effect can be enhanced.

Next, description will be made of other shape examples of the bimetal washer 230 described in Embodiment 4 with reference to FIGS. 9A to 9F. As in FIGS. 8A to 8D, each bimetal washer 230 illustrated in FIGS. 9A to 9F also has a shape that enhances the flange back correction effect in consideration of the displacement of the bimetal washer 230 in the circumferential direction.

Figure 9A:
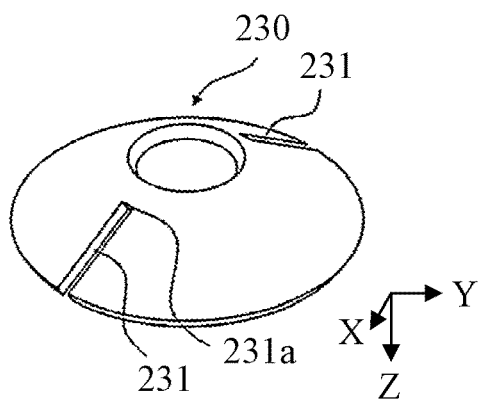
FIGS. 9A to 9F illustrate modified examples of the bimetal washer in Embodiment 4.
Figure 9B:
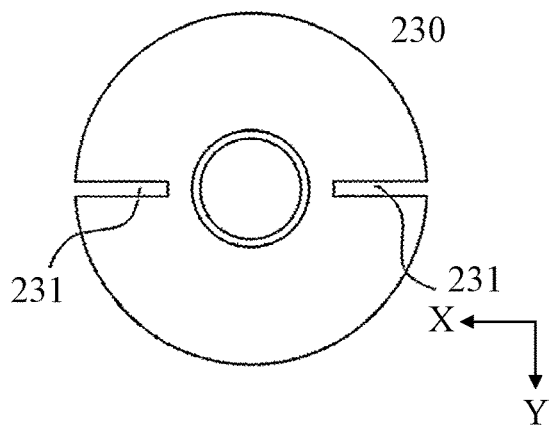

FIGS. 9A and 9B respectively illustrate the bimetal washer 230 in Shape Example 1 when viewed obliquely and from the front. FIGS. 9C to 9F illustrate the bimetal washers 230 in Shape Examples 2 and 3 when viewed obliquely and from the front.

The bimetal washer 230 of Shape Example 1 illustrated in FIGS. 9A and 9B has slit portions 231 each extending from its outer edge portion 232 toward its inner edge portion 233. Although two slit portions 231 are provided in FIGS. 9A and 9B, one slit portion or three or more slit portions may be provided. Compared to the bimetal washer 230 illustrated in FIGS. 8A to 8D, the inner edge portion 233 of the bimetal washer 230 of Shape Example 1 is not divided by the slit portions 231, so that an effect of suppressing a decrease in the spring constant can be expected. Therefore, even when the spring constant of the adjusting spring 203 is set to be large, it is possible to suppress an increase in the cancellation amount 5C illustrated in FIG. 5, and thereby to enhance the flange back correction effect.

Figure 9C:
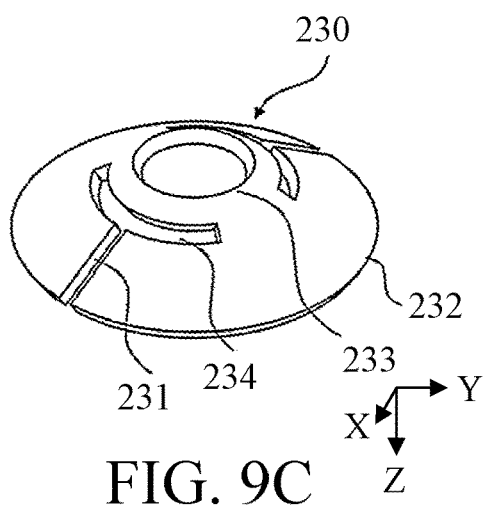
Figure 9D:
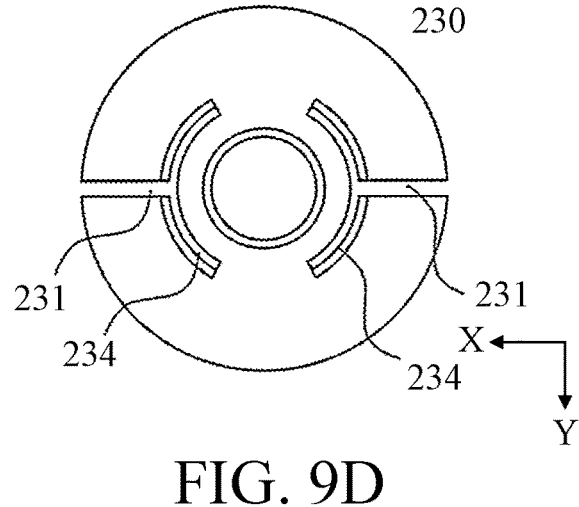

The bimetal washer 230 of Shape Example 2 illustrated in FIGS. 9C and 9D has first slit portions 231 each extending from its outer edge portion 232 toward its inner edge portion 233. Furthermore, the bimetal washer 230 of Shape Example 2 has second slit portions 234 each extending in its circumferential direction around the inner edge portion 233. Each second slit portion 234 is connected to each first slit portion 231.

As with the bimetal washer 230 of Shape Example 1 illustrated in FIGS. 9A and 9B, the inner edge portion 233 of the bimetal washer 230 of Shape Example 2 is not divided by the first slit portions 231, so that an effect of suppressing a decrease in the spring constant can be expected. In addition, the bimetal washer 230 of Shape Example 1 is in a state where its displacement in the circumferential direction is partially restrained around a corner portion 231a of each slit portion 231 on the side closer to the inner edge portion 233. On the other hand, in Shape Example 2, the second slit portions 234 each connected to each first slit portion 231 can release the displacement restraint around each first slit portion 231. Therefore, the bimetal washer 230 of Shape Example 2 has a shape capable of suppressing a decrease in the spring constant while releasing the displacement restraint in the circumferential direction. Thereby, the flange back correction effect can be enhanced.

Figure 9E:
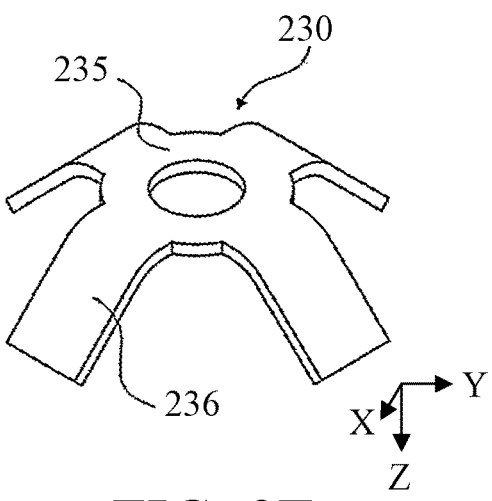
Figure 9F:
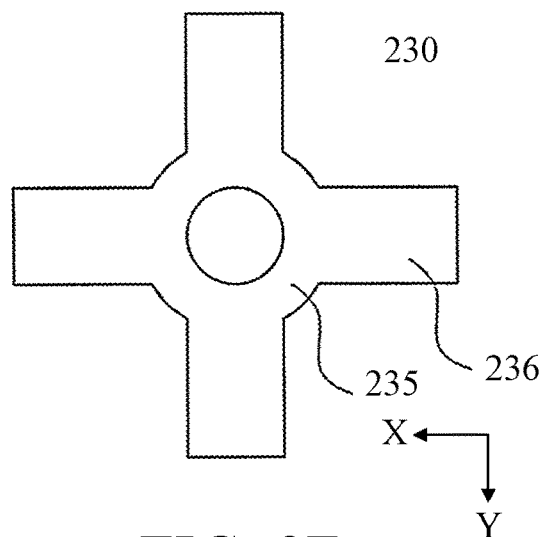

Moreover, the bimetal washer 230 may have a shape of Shape Example 3 illustrated in FIGS. 9E and 9F. The bimetal washer 230 of Shape Example 3 has a contact portion 235 that contacts the screw 205 and multiple leg portions 236 each extending from the contact portion 235 toward the image capturing base plate 202. Utilizing displacement of the contact portion 235 or the leg portions 236 in the optical axis direction makes it possible to provide the flange back correction effect.

Furthermore, a plurality of the bimetal washers 230 described in Embodiment 4 may be stacked. Stacking the bimetal washers 230 such that their inner edges 233 face each other makes it possible to enhance the flange back correction effect.

Although each of the above embodiments relates to a lens-interchangeable camera, the flange back correction mechanism described in each embodiment can also be applied to a lens-integrated camera. Further, electronic devices as other embodiments of the present invention include other electronic device having an image sensor than cameras.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-035525, filed on Mar. 8, 2022 which is hereby incorporated by reference herein in its entirety.

What is claimed is:
1. An electronic device comprising:
a base member;
a reference member fixed to the base member;
an image sensor;

a holding member holding the image sensor and being held by the base member such that a distance from the reference member to the image sensor is changeable;

a biasing member generating a first force that biases the holding member in a direction in which the distance increases; and a correction member providing, to the holding member, a second force acting against the first force, wherein the second force changes due to deformation of the correction member depending on its temperature, wherein the correction member and biasing member each have a spring constant, and the spring constant of the correction member is greater than that of the biasing member.

2. The electronic device according to claim 1, wherein the correction member is disposed between the holding member and a retaining member attached to the holding member, and the distance is adjustable by changing a position of the retaining member relative to the holding member.

3. The electronic device according to claim 2, wherein the correction member deforms depending on the temperature between a shape convex toward the reference member and a shape convex toward an opposite side of the reference member, and the correction member has an outer shape dimension larger than that of a contact part of the retaining member, the contact part contacting the correction member.

4. The electronic device according to claim 2, wherein the correction member has a contact surface contacting the retaining member and a leg portion extending from the contact surface toward the holding member, and the contact surface deforms such that its height in a direction of the second force changes depending on changes in the temperature.

5. The electronic device according to claim 1, wherein the correction member is provided, to the holding member, at each of multiple locations around a center of the image sensor.

6. The electronic device according to claim 1, wherein the correction member has a conic shape and has a slit portion extending from an outer edge portion of the correction member toward an inner edge portion thereof.

7. The electronic device according to claim 1, further comprising a mount as the reference member, and wherein a lens unit that forms an optical image is detachably attachable to the mount, the optical image being captured by the image sensor.

8. An electronic device comprising:

a base member;

a reference member fixed to the base member;

an image sensor;

a holding member holding the image sensor and being held by the base member such that a distance from the reference member to the image sensor is changeable;

a biasing member generating a first force that biases the holding member in a direction in which the distance increases; and a correction member providing, to the holding member, a second force acting against the first force, wherein the second force changes due to deformation of the correction member depending on its temperature, wherein the correction member is formed of bimetal, and the correction member deforms such that its height in a direction of the second force changes depending on changes in the temperature.

9. The electronic device according to claim 8, wherein the correction member is disposed between the holding member and a retaining member attached to the holding member, and the distance is adjustable by changing a position of the retaining member relative to the holding member.

10. The electronic device according to claim 9, wherein the correction member deforms depending on the temperature between a shape convex toward the reference member and a shape convex toward an opposite side of the reference member, and the correction member has an outer shape dimension larger than that of a contact part of the retaining member, the contact part contacting the correction member.

11. The electronic device according to claim 9, wherein the correction member has a contact surface contacting the retaining member and a leg portion extending from the contact surface toward the holding member, and the contact surface deforms such that its height in a direction of the second force changes depending on changes in the temperature.

12. The electronic device according to claim 8, wherein the correction member is provided, to the holding member, at each of multiple locations around a center of the image sensor.

13. The electronic device according to claim 8, wherein the correction member has a conic shape and has a slit portion extending from an outer edge portion of the correction member toward an inner edge portion thereof.

14. The electronic device according to claim 8, further comprising a mount as the reference member, and wherein a lens unit that forms an optical image is detachably attachable to the mount, the optical image being captured by the image sensor.

15. An electronic device comprising:

a base member;

a reference member fixed to the base member;

an image sensor;

a holding member holding the image sensor and being held by the base member such that a distance from the reference member to the image sensor is changeable;

a biasing member generating a first force that biases the holding member in a direction in which the distance increases; and a correction member providing, to the holding member, a second force acting against the first force, wherein the second force changes due to deformation of the correction member depending on its temperature, wherein the correction member is formed of shape memory alloy, and the correction member deforms when the temperature is higher than a transformation temperature of the shape memory alloy into a shape generating the second force greater than that when the temperature is equal to or lower than the transformation temperature.

16. The electronic device according to claim 15, wherein the correction member is disposed between the holding member and a retaining member attached to the holding member, and the distance is adjustable by changing a position of the retaining member relative to the holding member.

17. The electronic device according to claim 16, wherein the correction member deforms depending on the temperature between a shape convex toward the reference member and a shape convex toward an opposite side of the reference member, and the correction member has an outer shape dimension larger than that of a contact part of the retaining member, the contact part contacting the correction member.

18. The electronic device according to claim 16, wherein the correction member has a contact surface contacting the retaining member and a leg portion extending from the contact surface toward the holding member, and the contact surface deforms such that its height in a direction of the second force changes depending on changes in the temperature.

19. The electronic device according to claim 15, wherein the correction member is provided, to the holding member, at each of multiple locations around a center of the image sensor.

20. The electronic device according to claim 15, wherein the correction member has a conic shape and has a slit portion extending from an outer edge portion of the correction member toward an inner edge portion thereof.

21. The electronic device according to claim 15, further comprising a mount as the reference member, and wherein a lens unit that forms an optical image is detachably attachable to the mount, the optical image being captured by the image sensor.

22. An image capturing apparatus comprising:
a base member;
a mount that is fixed to the base member and to which a lens unit is detachably attachable;
an image sensor;
a holding member holding the image sensor and being held by the base member such that a distance from the mount to the image sensor in an optical axis direction is changeable;
a retaining member used for attaching the holding member to the base member;
a biasing member generating a first force that biases the holding member in a direction in which the distance increases; and
a correction member providing, to the holding member, a second force acting against the first force,
wherein an elastic modulus of the correction member is greater than that of the biasing member, and
the correction member is disposed between the holding member and the retaining member.

23. The image capturing apparatus according to claim 22, wherein, compared to the second force at a first temperature, the second force at a second temperature higher than the first temperature is greater, and thereby the holding member moves further on an object side at the second temperature than at the first temperature.

24. The image capturing apparatus according to claim 23, wherein the correction member has a conic shape and has a slit portion extending from an outer edge portion of the correction member toward an inner edge portion thereof.

* * * * *